(12) United States Patent
Hong

(10) Patent No.: US 7,661,519 B2
(45) Date of Patent: Feb. 16, 2010

(54) ROLLER DEVICE FOR A CONVEYER

(76) Inventor: Shih-An Hong, No. 24, Nan Kung 3rd Rd., Nan Kung Industrial Zone, Nan Tou City (TW)

( * ) Notice: Subject to any disclaimer, the term of this patent is extended or adjusted under 35 U.S.C. 154(b) by 0 days.

(21) Appl. No.: 12/133,905

(22) Filed: Jun. 5, 2008

(65) Prior Publication Data

US 2009/0188777 A1  Jul. 30, 2009

(30) Foreign Application Priority Data

Jan. 30, 2008  (TW) ............................... 97202021 U

(51) Int. Cl.
*B65G 13/00*  (2006.01)
(52) U.S. Cl. ........................................ 193/37; 384/144
(58) Field of Classification Search .................. 193/37; 384/144

See application file for complete search history.

(56) References Cited

U.S. PATENT DOCUMENTS

| | | | | |
|---|---|---|---|---|
| 3,815,196 A | * | 6/1974 | Gotham et al. ................. | 193/37 |
| 4,344,218 A | * | 8/1982 | Hooper et al. ................. | 29/516 |
| 5,433,308 A | * | 7/1995 | Gagnon ......................... | 193/37 |
| 5,944,161 A | * | 8/1999 | Sealey ............................ | 193/37 |
| 5,960,931 A | * | 10/1999 | Nilsson ........................ | 198/624 |
| 6,148,986 A | * | 11/2000 | Brink et al. ..................... | 193/37 |
| 6,286,659 B1 | * | 9/2001 | Petrovic ....................... | 198/780 |
| 6,287,014 B1 | * | 9/2001 | Salla ............................ | 384/546 |
| 6,419,070 B1 | * | 7/2002 | Agnoff .......................... | 193/37 |
| 6,755,299 B2 | * | 6/2004 | Itoh et al. ..................... | 198/780 |

\* cited by examiner

*Primary Examiner*—Mark A Deuble
(74) *Attorney, Agent, or Firm*—Rodman & Rodman

(57) ABSTRACT

A roller device mountable rotatably on a spindle includes a roller body having a tubular wall with two opposite open-end portions. Each open-end portion is provided with a retaining member formed on an inner peripheral surface of the tubular wall. Two covers are inserted respectively into the open-end portions of the tubular wall, and are adapted to be sleeved rotatably around the spindle. Each cover has an annular end wall transverse to the corresponding open-end portion, a surrounding wall extending inwardly and axially from an outer periphery of the end wall and abutting against the inner peripheral surface of the tubular wall, and an engaging member formed on an outer peripheral surface of the surrounding wall and interlocking the retaining member. The retaining and engaging members have recess-and-protrusion interlocking surfaces.

3 Claims, 6 Drawing Sheets

ROLLER DEVICE FOR A CONVEYER

CROSS-REFERENCE TO RELATED APPLICATION

This application claims priority of Taiwanese Application No. 097202021, filed on Jan. 30, 2008.

BACKGROUND OF THE INVENTION

1. Field of the Invention

The invention relates to a roller device, more particularly to a roller device for a conveyer that is mountable rotatably on a spindle.

2. Description of the Related Art

Referring to FIG. 1, a currently available roller device for a conveyer includes a roller body 1 sleeved on a spindle 3, two covers 2 (only one is shown) respectively covering two opposite ends of the roller body 1 and sleeved rotatably around the spindle 3, and two anti-leak units 4 (only one is shown) respectively disposed on outer sides of the covers 2. The roller body 1 has a smooth inner peripheral surface 102 defining a receiving hole 101. Each cover 2 has a cover body 201 received in the receiving hole 101, an annular sleeve 202 connected to an outer periphery of the cover body 201, and an annular groove 203 formed between the outer periphery of the cover body 201 and the annular sleeve 202 so as to permit radial expansion or compression of the annular sleeve 202.

After assembly, the covers 2 are respectively positioned on the two opposite ends of the roller body 1 through the expansion and compression of the annular sleeves 202 thereof. However, to prevent the covers 2 from falling off the roller body 1, the annular sleeve 202 must be adhered to the inner peripheral surface 102 of the roller body 1 by using an adhesive. Hence, assembly of the aforesaid roller device is troublesome and time-consuming, which result in a lowering of the production yield.

SUMMARY OF THE INVENTION

Therefore, the object of the present invention is to provide a roller device for a conveyer that can be easily assembled and that has a stable connection after assembly, thereby increasing the production yield.

According to this invention, a roller device mountable rotatably on a spindle comprises a roller body and two covers. The roller body includes a tubular wall having two opposite open-end portions. Each of the open-end portions is provided with a retaining member formed on an inner peripheral surface of the tubular wall. The covers are inserted respectively into the two opposite open-end portions of the tubular wall, and are adapted to be sleeved rotatably around the spindle. Each of the covers has an annular end wall transverse to one of the open-end portions, a surrounding wall extending inwardly and axially from an outer periphery of the annular end wall and abutting against the inner peripheral surface of the tubular wall, and an engaging member formed on an outer peripheral surface of the surrounding wall and interlocking the retaining member. The retaining member and the engaging member have recess-and-protrusion interlocking surfaces.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
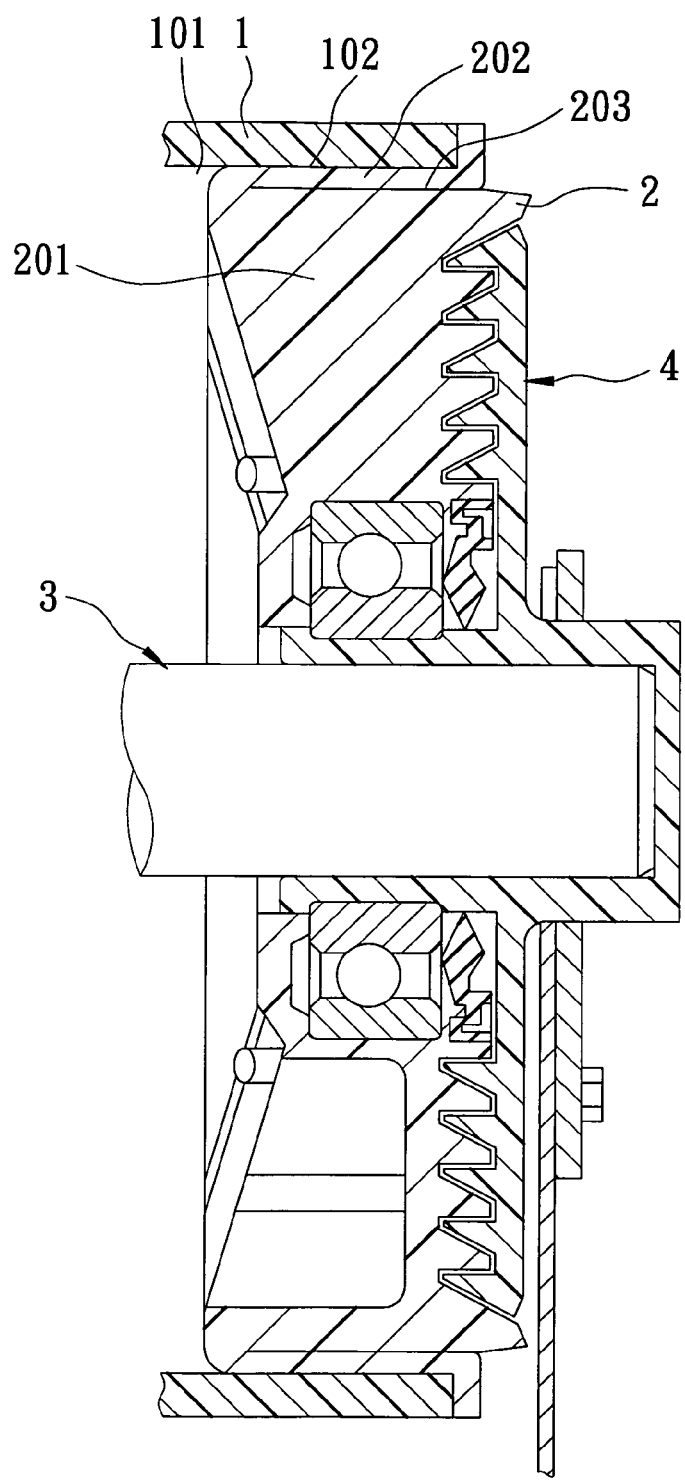
FIG. 1 is a fragmentary enlarged sectional view of a currently available roller device for a conveyer.
Figure 2:
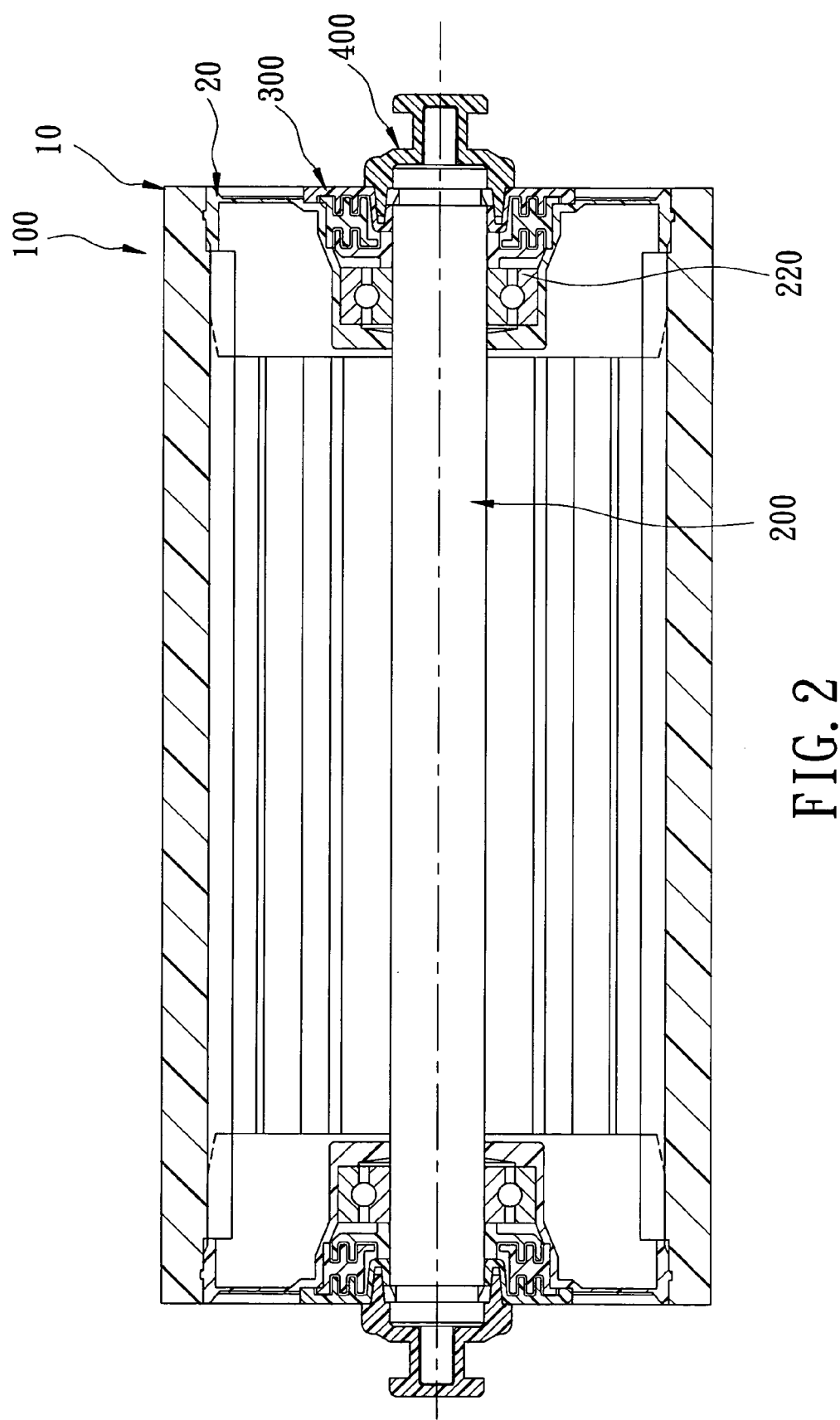
FIG. 2 is a sectional view of a roller device for a conveyer according to the preferred embodiment of the present invention.

Referring to FIGS. 2 to 6, the preferred embodiment of a roller device 100 for a conveyer according to the present invention is shown to comprise a roller body 10, two covers 20, two anti-leak assemblies 300, and two protective caps 400.

The roller body 10 is made of a fiber reinforced plastic material, and is adapted to be mounted rotatably on a spindle 200. The roller body 10 includes a tubular wall 12 defining a receiving hole 11 and having two opposite open-end portions. Each of the open-end portions is provided with a retaining member 122 formed on an inner peripheral surface 121 of the tubular wall 12, and has an opening 123, and a corner 124 formed annularly at the opening 123 and connected to the inner peripheral surface 121 of the tubular wall 12. The tubular wall 12 further has a plurality of angularly spaced-apart elongated ribs 13 projecting inwardly from and extending axially along the inner peripheral surface 121, and a plurality of angularly spaced-apart elongated grooves 14 each confined between two adjacent ones of the elongated ribs 13 and communicating with the receiving hole 11.

The covers 20 are inserted respectively into the two opposite open-end portions of the tubular wall 12 so as to cover the roller body 10, and are adapted to be sleeved rotatably around the spindle 200. Each cover 20 has an annular end wall 22 transverse to the corresponding open-end portion of the tubular wall 12, a surrounding wall 23 extending inwardly and axially from an outer periphery of the end wall 22 and abutting against the inner peripheral surface 121 of the tubular wall 12, an engaging member 232 formed on an outer peripheral surface 231 of the surrounding wall 23 and interlocking the retaining member 122, a tubular seat 21 adapted to be sleeved around the spindle 200 and extending axially and inwardly from an inner periphery of the end wall 22 within the surrounding wall 23, and pairs of spaced-apart positioning blades 24 disposed around and projecting radially and outwardly from an outer periphery of the tubular seat 21. The positioning blades 24 are connected to the surrounding wall 23, and project axially from the end wall 22 into the tubular wall 12. The positioning blades 24 of each pair of the same have blade ends.241 extending into one of the grooves 14 to prevent relative movement between the tubular wall 12 and the covers 20.

The retaining member 122 and the engaging member 232 have recess-and-protrusion interlocking surfaces. In this embodiment, the interlocking surfaces include an annular recess 1221 formed in the inner peripheral surface 121 of the tubular wall 12, and an annular protrusion 2321 formed on the outer peripheral surface 231 of the surrounding wall 23. The elongated ribs 13 extend axially between the annular recesses 1221 formed in the inner peripheral surface 121 of the tubular wall 12 at the two opposite open-end portions thereof.

The annular protrusion 2321 projects radially from the outer peripheral surface 231 of the surrounding wall 23, and has an axially extending annular end face 2322 (see FIGS. 5 and 6) distal from the outer peripheral surface 231, and an annular guide surface 2323 (see FIGS. 5 and 6) extending from the outer peripheral surface 231 to the annular end face 2322 and inclined with respect to a radial direction that is perpendicular to a rotation axis of the covers 20.

The tubular seat 21 has a small diameter hole portion 211, a large diameter hole portion 212 extending outwardly from the small diameter hole portion 211, and an open-end at the large diameter hole portion 212.

Bearing assemblies 220 are sleeved on the spindle 200 to support rotatably the roller body 10 on the spindle 200. Each bearing assembly 220 is disposed in the small diameter hole portion 211 of the tubular seat 21 of the respective cover 20.

Each of the anti-leak assemblies 300 is disposed in the large diameter hole portion 212 of the tubular seat 21 of the respective cover 20, and has an inner fixed seal member 310 proximate to the corresponding bearing assembly 220, an outer fixed seal member 320 disposed outwardly of the inner fixed seal member 310, and a movable seal member 330 disposed between the inner and outer fixed seal members 310, 320. The inner and outer fixed seal members 310, 320 and the movable seal member 330 form a labyrinthine structure.

The protective caps 400 are respectively disposed on two opposite ends of the spindle 200 to limit axial movement of the anti-leak assemblies 300.

Figure 3:
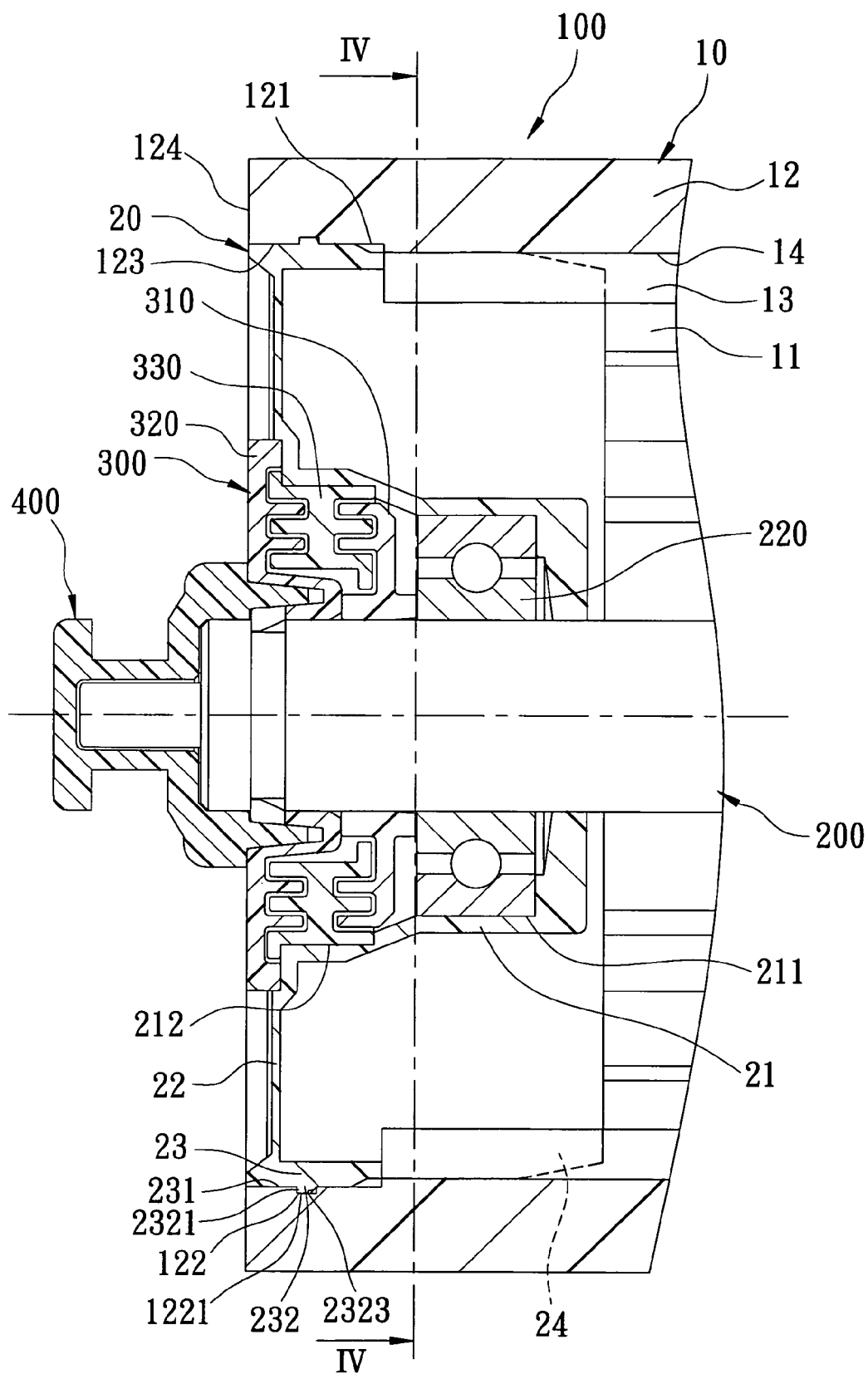
FIG. 3 is a fragmentary enlarged sectional view of the preferred embodiment.
Figure 4:
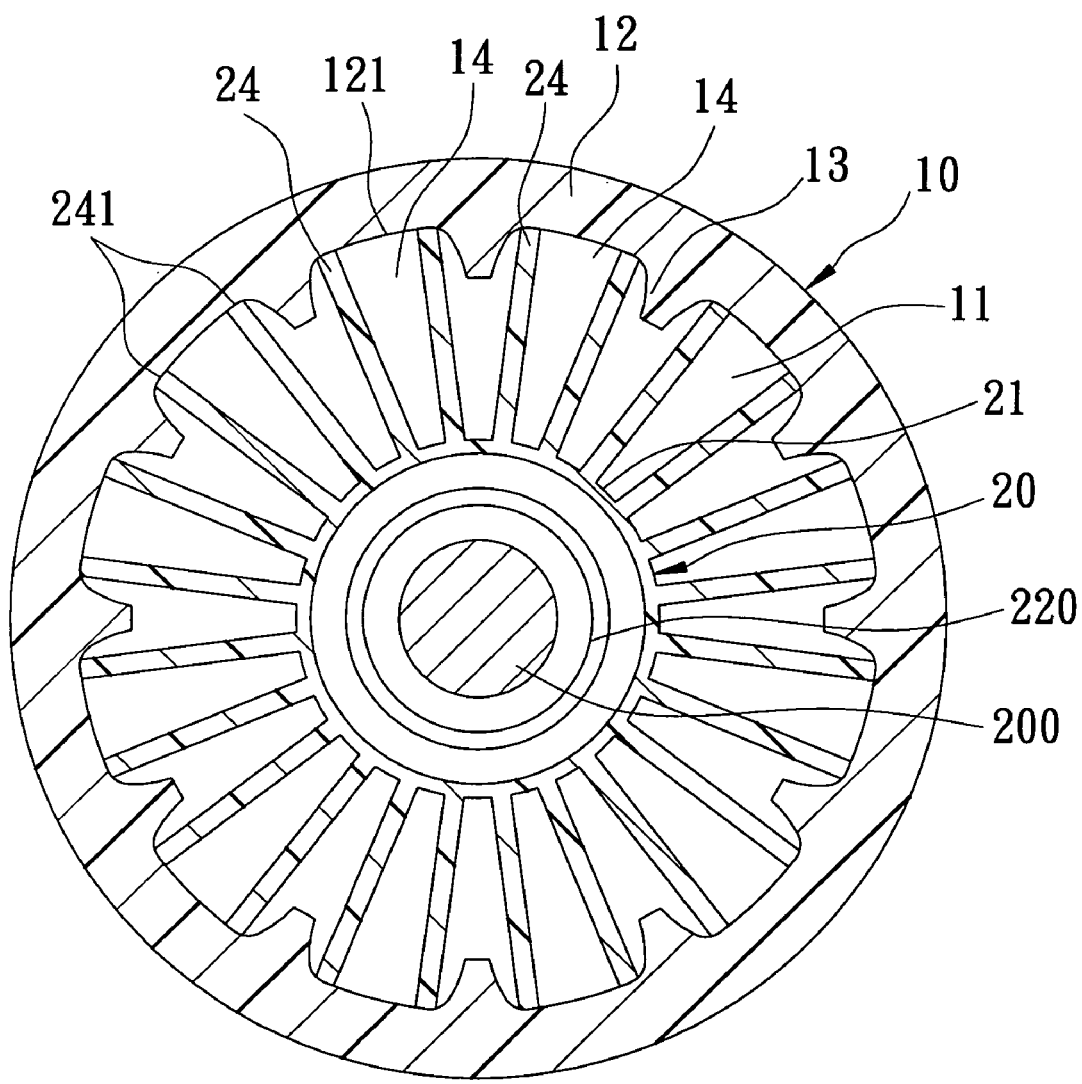
FIG. 4 is a sectional view of the preferred embodiment taken along line IV-IV of FIG. 3.
Figure 5:
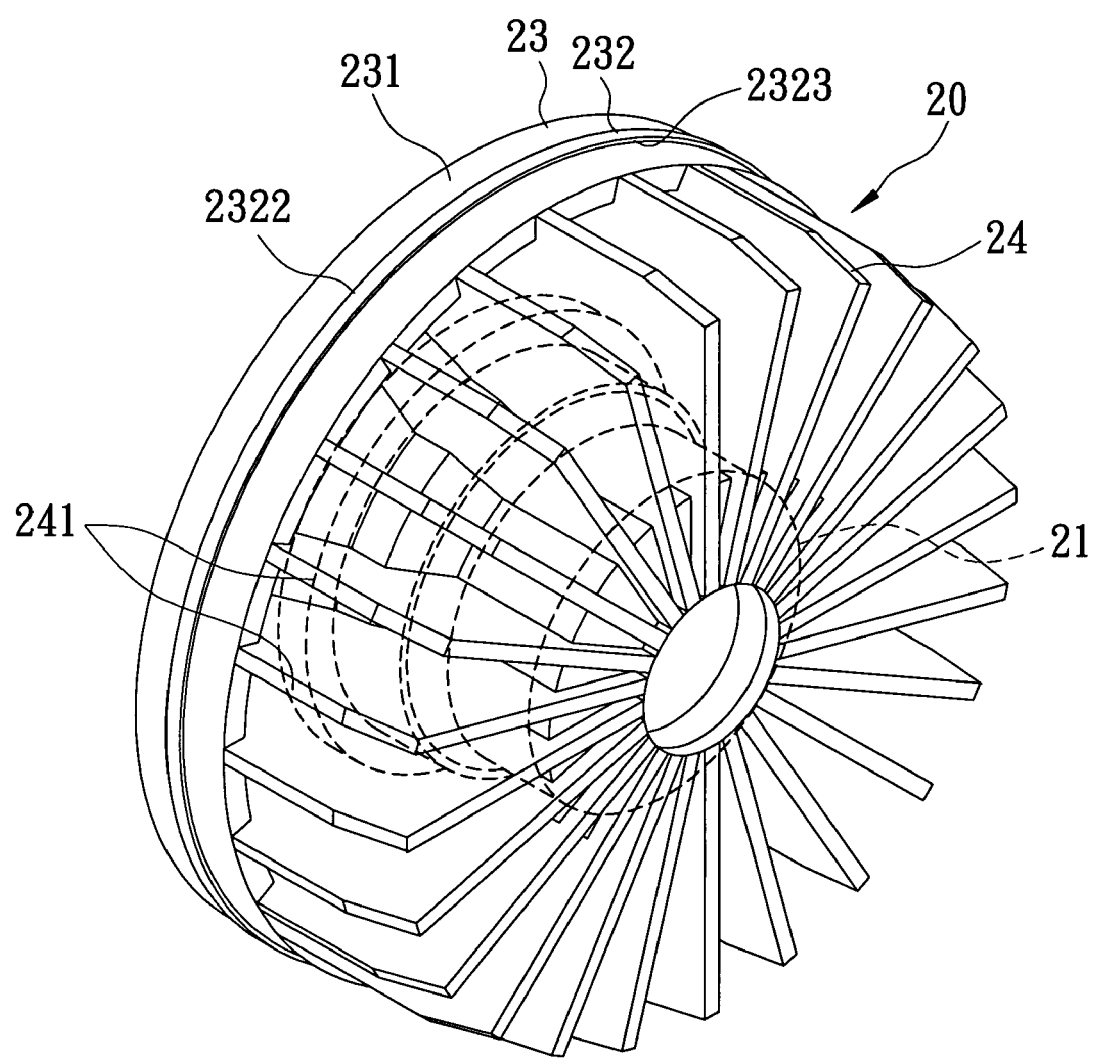
FIG. 5 is a perspective view of a cover of the preferred embodiment.
Figure 6:
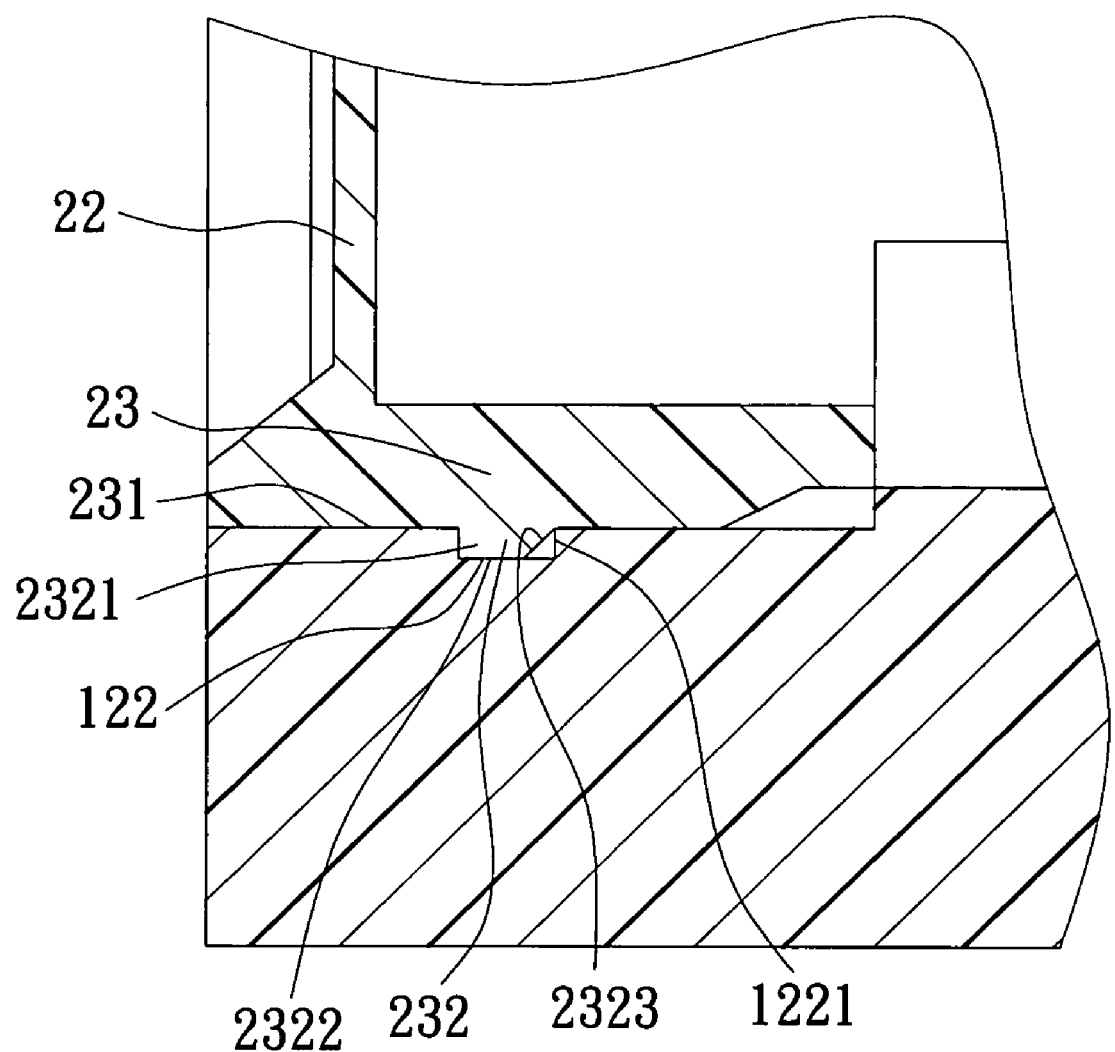
FIG. 6 is a fragmentary enlarged sectional view of the preferred embodiment, illustrating engagement between a retaining member of a roller body and an engaging member of a cover.

With reference to FIGS. 3, 4, and 5, during assembly of the roller device 100, each cover 20 is directly inserted into the respective open-end portion of the tubular wall 12 with each pair of the positioning blades 24 extending axially into the corresponding groove 122. Because the annular protrusion 2321 is provided with the guide surface 2323, and because the annular protrusion 2321 has a measure of elasticity, the guide surface 2323 can slide over the corner 124 so as to guide the annular protrusion 2321 to move along the inner peripheral surface 121 of the tubular wall 12 until it engages the annular recess 1221. As such, the covers 20 can be positioned axially and respectively in the open-end portions of the tubular wall 12. Further, through the arrangement of the positioning blades 24 and the ribs 13, i.e., the blade ends 241 of the positioning blades 24 extending into the grooves 14, as best shown in FIG. 4, relative movement between the tubular wall 12 and the covers 20 can be prevented.

Referring back to FIG. 2, after the roller device 100, the anti-leak assemblies 300, and the protective caps 400 are assembled, the roller device 100 can rotate smoothly relative to the spindle 200 through the bearing assemblies 220. Further, through the presence of the anti-leak assemblies 300 and the protective caps 400, the roller device 100 is fully sealed, so that dust and moisture can be prevented from entering the roller device 100, thereby prolonging the service life of the spindle 200, the bearing assemblies 220, and the entire roller device 100.

It is worth mentioning that since the tubular wall 12 of the roller body 10 is provided with the ribs 13, aside from limiting axial movement of the positioning blades 24 of the covers 20 so as to prevent relative movement between the tubular wall 12 and the covers 20, the ribs 13 can also enhance the structural strength of the roller body 10.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A roller device mountable rotatably on a spindle, comprising:
   a roller body including a tubular wall having two opposite open-end portions, each of said open-end portions being provided with a retaining member formed on an inner peripheral surface of said tubular wall, said tubular wall further having a plurality of angularly spaced-apart elongated ribs projecting inwardly from and extending axially along said inner peripheral surface of said tubular wall, and a plurality of angularly spaced-apart elongated grooves each confined between two adjacent ones of said elongated ribs; and
   two covers inserted respectively into said two opposite open-end portions of said tubular wall and being adapted to be sleeved rotatably around the spindle, each of said covers having an annular end wall transverse to one of said open-end portions, a surrounding wall extending inwardly and axially from an outer periphery of said annular end wall and abutting against said inner peripheral surface of said tubular wall, a tubular seat adapted to be sleeved around the spindle and extending axially and inwardly from said end wall within said surrounding wall, pairs of spaced-apart positioning blades disposed around and projecting radially and outwardly from said tubular seat, and an engaging member formed on an outer peripheral surface of said surrounding wall and interlocking said retaining member, said retaining member and said engaging member having recess-and-protrusion interlocking surfaces, each pair of said positioning blades being connected to said surrounding wall and projecting axially from said end wall into said tubular wall, and having blade ends extending into one of said grooves to prevent relative movement between said tubular wall and said covers.

2. The roller device of claim 1, wherein said interlocking surfaces include an annular recess formed in said inner peripheral surface of said tubular wall, and an annular protrusion projecting from said outer peripheral surface of said surrounding wall.

3. The roller device of claim 2, wherein said annular protrusion projects radially from said outer peripheral surface of said surrounding wall, and has an axially extending annular end face distal from said outer peripheral surface, and an annular guide surface extending from said outer peripheral surface to said annular end face and inclined with respect to a radial direction that is perpendicular to a rotation axis of said covers, each of said open-end portions having an opening, and a corner formed annularly at said opening and connected to said inner peripheral surface of said tubular wall, said guide surface being slidable over said corner to guide said annular protrusion to move along said inner peripheral surface of said tubular wall when a corresponding one of said covers is inserted into a corresponding one of said open-end portions.

* * * * *